United States Patent [19]

Reich et al.

[11] Patent Number: 5,734,002
[45] Date of Patent: Mar. 31, 1998

[54] AMINO-MODIFIED URETHANEACRYLATES

[75] Inventors: Wolfgang Reich, Maxdorf; Erich Beck, Ladenburg; Edmund Keil, Heuchelheim; Ulrich Jäger, Harthausen; Matthias Lokai, Enkenbach-Alsenborn; Werner Fries, Böhl-Iggelheim; Eberhard Ambach, Dannstadt-Schauernheim, all of Germany

[73] Assignee: BASF Aktiengesellschaft, Ludwigshafen, Germany

[21] Appl. No.: 611,791

[22] Filed: Mar. 6, 1996

[30] Foreign Application Priority Data

Mar. 9, 1995 [DE] Germany ............ 195 08 310.5
Mar. 9, 1995 [DE] Germany ............ 195 08 308.3

[51] Int. Cl.$^6$ ........................... C08G 18/08
[52] U.S. Cl. ............ 528/53; 528/68; 528/75; 528/76; 528/80; 528/81; 528/82
[58] Field of Search ............ 528/53, 68, 80, 528/81, 82, 75, 76

[56] References Cited

U.S. PATENT DOCUMENTS 5,442,090  8/1995  Beck et al. .................. 560/25

FOREIGN PATENT DOCUMENTS

| 0 211 978 | 3/1987 | European Pat. Off. . |
| 0 280 222 | 8/1988 | European Pat. Off. . |
| 2 346 424 | 4/1974 | Germany . |
| 40 07 146 | 9/1991 | Germany . |

*Primary Examiner*—John M. Cooney, Jr.
*Attorney, Agent, or Firm*—Oblon, Spivak, McClelland, Maier & Neustadt, P.C.

[57] ABSTRACT

Urethane(meth)acrylates are obtainable by a) reacting polyether(meth)acrylates or polyester(meth)acrylates, which may also have at least one free hydroxyl group, with primary or secondary amino compounds which have at least one hydroxyl group, so that from 0.5 to 60 mol % of the (meth)acrylate groups are present in the form of Michael adducts with the amino compounds, and b) subsequently reacting the product obtained in a) with isocyanates.

10 Claims, No Drawings

AMINO-MODIFIED URETHANEACRYLATES

BACKGROUND OF THE INVENTION

The present invention relates to urethane(meth)acrylates, obtainable by reacting polyether(meth)acrylates, polyester (meth)acrylates or epoxy(meth)acrylates, which have at least one free hydroxyl group and in which from 0.5 to 60 mol % of the (meth)acrylate groups are present in the form of a Michael adduct with primary or secondary amines, with isocyanates, and in particular urethane(meth)acrylates, obtainable by a) reacting polyether(meth)acrylates, polyester(meth) acrylates and epoxy(meth)acrylates, which may also have at least one free hydroxyl group, with primary or secondary amino compounds which have at least one hydroxyl group, so that from 0.5 to 60 mol % of the (meth)acrylate groups are present in the form of Michael adducts with the amino compounds, and b) subsequently reacting the product contained in a) with isocyanates.

DE-A-23 46 424 and EP-A-211 978 disclose Michael adducts of primary or secondary amines with acrylates. The amino-modified acrylates described are used, for example, in coating materials and have high reactivity in radiation curing.

EP-A-280 222 describes corresponding Michael adducts of primary monoamines and acrylates. The acrylates mentioned include reaction products of hydroxyl-containing (meth)acrylates with mono- or oligomers containing isocyanate groups.

DE-A-4 007 146 relates to urethane(meth)acrylates containing both amine and, necessarily, urea groups and having a content of amino groups bound by Michael addition. Acrylates which are obtained, for example, by reacting acrylic acid with monohydric or polyhydric alcohols or with the alkoxylated derivatives thereof are mentioned as starting components for the urethane(meth)acrylates.

For the radiation curing, urethane(meth)acrylates having very high reactivity are desirable. Furthermore, the viscosity of the urethane(meth)acrylates should be low so that, for example, when used as coating materials, large amounts of reactive diluents or solvents for establishing the processing viscosity are avoided.

OBJECT OF THE INVENTION

It is an object of the present invention to provide urethane (meth)acrylates having very high reactivity on radiation curing and at the same time a low viscosity.

We have found that this object is achieved by the urethane (meth)acrylates described above.

We have also found processes for the preparation of the urethane(meth)acrylates, and radiation-curable materials which contain the urethane(meth)acrylates.

Polyether(meth)acrylates or polyester(meth)acrylates as starting materials for the urethane(meth)acrylates are obtainable in a known manner by esterification of (meth)acrylic acid with polyethers or polyesters containing hydroxyl groups.

In general, acrylates are preferred to methacrylates. Polyetheracrylates are particularly preferred. The polyester (meth)acrylates and polyether(meth)acrylates preferably contain from 1 to 5, in particular from 2 to 4, (meth)acrylate groups and from 0 to 3, in particular from 1 to 2 hydroxyl groups in the molecule.

In the esterification, the molar ratio of (meth)acrylic acid to the polyesters or polyethers is suitably chosen so that no hydroxyl groups or the desired number of hydroxyl groups remain in the molecule.

The molecular weights $M_n$ of the polyesters or polyethers are preferably from 100 to 4000 ($M_n$ determined by gel permeation chromatography).

The polyesters or polyethers preferably contain no double bonds. Polyesters can be prepared, for example, in a conventional manner by esterifying dicarboxylic acids or polycarboxylic acids with diols or polyols. The starting materials for such hydroxyl-containing polyesters are known to a person skilled in the art. Succinic acid, glutaric acid, adipic acid, sebacic acid, o-phthalic acid, their isomers and hydrogenation products and esterifiable derivatives, such as anhydrides or dialkyl esters of the stated acids, may preferably be used as dicarboxylic acids. Preferred diols are ethylene glycol, 1,2- and 1,3-propylene glycol, butane-1,4-diol, hexane-1,6-diol, neopentylglycol and cyclohexanedimethanol, and polyglycols of the ethylene glycol and propylene glycol type are also preferred.

Examples of polyols are primarily trimethylolpropane, glycerol and pentaerythritol.

BRIEF DESCRIPTION OF THE INVENTION

Suitable diols or polyols include oxyalkylated (for example with ethylene oxide or propylene oxide) diols or polyols, in particular having a degree of oxyalkylation of from 0 to 10, based on the respective hydroxyl groups of the diol or polyol, or a degree of oxyalkylation of from 1 to 10, based on all hydroxyl groups of the diol or polyol.

DETAILED DESCRIPTION OF THE INVENTION

Polyesterols to be used according to the invention include polycaprolactonediols and polycaprolactonetriols, the preparation of which is likewise known to a person skilled in the art.

Examples of suitable polyethers which contain no ester groups are those which can be obtained by known processes, by reacting dihydric and/or polyhydric alcohols, for example the abovementioned diols or polyols, with various amounts of ethylene oxide and/or propylene oxide. Polymerization products of tetrahydrofuran or of butylene oxide may also be used.

Oxyalkylation products of the abovementioned diols or polyols, in particular having a degree of oxyalkylation of preferably from 0 to 10, based on the particular hydroxyl groups of the diol or polyol, are preferred, but a total of at least 2, preferably at least 3, particularly preferably at least 4, alkoxy groups are present in the polyether, and in general not more than 20 alkoxy groups are present.

Epoxy(meth)acrylates which may also contain free hydroxyl groups are, for example, those obtainable by reacting epoxidized olefins or diglycidyl ethers, for example aromatic polyepoxides, such as bisphenol A diglycidyl ether, with (meth)acrylic acid.

Polyesteracrylates are particularly and polyetheracrylates very particularly preferred.

In the polyether(meth)acrylates, polyester(meth)acrylates or epoxy(meth)acrylates, from 0.5 to 60, preferably from 0.5 to 30, particularly preferably from 0.5 to 15, especially from 1 to 15, very particularly preferably from 1 to 10, mol % of the (meth)acrylate groups are present in the form of a Michael adduct with primary or secondary amines.

Primary or secondary amino groups undergo a Michael addition at acrylate groups:

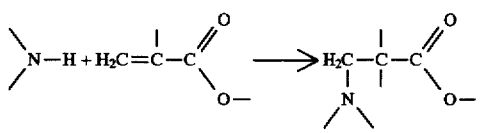

Primary amino groups are thus converted into secondary amino groups, which in turn may undergo addition at acrylate groups with formation of tertiary amino groups.

Suitable compounds having primary or secondary amino groups are in general low molecular weight and preferably have a molecular weight of less than 1000. Preferred compounds contain from 1 or 2 to 6, particularly preferably from 2 to 4, amine hydrogen atoms (N—H) of primary or secondary amines.

Examples are primary monoamines (2 amine hydrogen atoms), such as $C_1$–$C_{20}$-alkylamines, in particular n-butylamine, n-hexylamine, 2-ethylhexylamine or octadecylamine, cycloaliphatic amines, such as cyclohexylamine, and amines containing (hetero)aromatic groups, such as benzylamine, 1-(3-aminopropyl)imidazole or tetrahydrofurfurylamine.

Compounds having 2 primary amino groups are, for example, $C_1$–$C_{20}$-alkylenediamines, such as ethylenediamine, butylenediamine, etc.

Amino compounds having at least 1 hydroxyl group, preferably from 1 to 3 hydroxyl groups, particularly preferably 1 hydroxyl group, are also particularly suitable.

Examples are alkanolamines, in particular $C_2$–$C_{20}$-alkanolamines, such as ethanolamine, propanolamine or butanolamine.

The Michael adducts can be formed in a simple manner by adding the amino compounds to the (meth)acrylates at, preferably, from 10° to 100° C.

The novel urethane(meth)acrylates can then be obtained by reacting the polyether(meth)acrylates, polyester(meth)acrylates or epoxy(meth)acrylates, which have at least one free hydroxyl group and in which from 0.5 to 60 mol % of the (meth)acrylate groups are present in the form of a Michael adduct with primary or secondary amines, with isocyanates or epoxy(meth)acrylates. The free hydroxyl group or hydroxyl groups (preferably from 1 to 6, particularly preferably from 1 to 3 hydroxyl groups) may be present in the molecule, for example, as a result of nonequimolar reaction of the (meth)acrylates with polyesterols, polyetherols or the starting compounds of the epoxy(meth) acrylates. In a preferred embodiment, however, at least some or all of the hydroxyl groups are introduced into the molecule by means of the hydroxyl-containing amino group.

Suitable isocyanates are those having an average isocyanate functionality of at least 2.0 (ie. at least two isocyanate groups in the molecule), preferably from 2.2 to 5.0, and an isocyanate content of from 5 to 30, preferably from 10 to 25, % by weight and preferably a maximum viscosity of 10,000 mPa·s at 25° C. Aliphatic, cycloaliphatic and aromatic diisocyanates, eg. butane 1,4-diisocyanate, hexane 1,6-diisocyanate, 2,2,4- and 2,4,4-trimethylhexamethylene diisocyanate, cyclohexane diisocyanate, methylcyclohexane diisocyanate, isophorone diisocyanate, 4,4'-diisocyanatodiphenylmethane, 4,4'-diisocyanatodicyclohexylmethane, toluylene 2,4- and 2,6-diisocyanate and tetramethylxylylene diisocyanate, are in principle suitable. Furthermore, isocyanurates or biurets of the abovementioned diisocyanates are particularly suitable.

It is also possible to use, for example, coating polyisocyanates, as described, for example, in European Patent 0,358,979. These compounds are, for example, the adducts of, for example, the above diisocyanates, eg. 1,6-diisocyanatohexane or isophorone diisocyanate, which adducts contain uretdione, biuret and isocyanurate groups and may have a lower viscosity of, for example, from 50 to 500 or from 50 to 3000 mPa·s at 25° C. Isocyanate curing agents which additionally contain an emulsifier in an amount which ensures dispersibility in water are particularly preferred, and the emulsifier may be a reaction product of a polyisocyanate with a monohydric or polyhydric, nonionic polyether alcohol having at least one polyether chain containing at least 10 ethylene oxide units.

Such water-emulsifiable polyisocyanates are described, for example, in European Patent 0,206,059 or German Laid-Open Application DOS 4,036,927.

The reaction of the isocyanates with the polyether(meth) acrylates, polyester(meth)acrylates or epoxy(meth)acrylates a) can be carried out preferably at from 0° to 100° C., particularly preferably from 20° to 80° C.

In order to accelerate the reaction, catalysts as described, for example, in Houben-Weyl, Methoden der organischen Chemie, Vol. XIV/2, page 60 et seq., Georg-Thieme-Verlag, Stuttgart (1963), or Ullmann, Encyclopädie der technischen Chemie, Vol. 19, page 306 (1981), may be used. Tin-containing compounds, such as dibutyltin dilaurate, tin(II) octoate or dibutyltin dimethoxide, are preferred. In general, such catalysts are used in an amount of from 0.001 to 2.5, preferably from 0.005 to 1.5, % by weight, based on the total amount of the reactants.

In the reaction with isocyanates, the ratio of amounts is preferably chosen so that there are from 0.7 to 1.3 OH groups per NCO group. The ratio of NCO to OH groups is particularly preferably chosen to be roughly equimolar.

The novel urethane acrylates are preferably essentially free of urea groups.

The urethane(meth)acrylates, preferably urethaneacrylates, obtainable by the novel process are in general liquid and have a low viscosity, with the result that in particular the requirement for reactive diluents for establishing viscosities suitable for processing is reduced.

The urethane(meth)acrylates also have a very long shelf life, particularly at below 10° C. the long shelf life manifests itself, for example, in little tendency to crystallize and to exhibit thixotropy.

They are particularly suitable for use as or in radiation-curable materials, in particular coating materials which can be cured thermally, but preferably by high-energy radiation.

The materials can be used as or in coating materials, for example finishes, printing inks or adhesives, as printing plates, as moldings, for the production of photoresists, in stereolithography or as casting material, for example for optical lenses.

For use as or in radiation-curable materials, additives, eg. crosslinking agents, thickeners, leveling agents or fillers or pigments, etc., may be added.

The radiation-curable acrylates or their formulations can be cured thermally, preferably by high-energy radiation, such as UV light or electron beams.

For radiation curing by UV light, photoinitiators are usually added.

Examples of suitable photoinitiators are benzophenone and derivatives thereof, such as alkylbenzophenones, halomethylated benzophenones and Michler's ketone, and benzoin and benzoin ether, such as ethylbenzoin ether, benzil ketals, such as benzil dimethyl ketal, acetophenone derivatives, eg. hydroxy-2-methylphenylpropan-1-one and hydroxycyclohexyl phenyl ketone, anthraquinone and its derivatives, such as methylanthraquinone, and in particular acylphosphine oxides, eg. Lucirin® TPO (2,4,6-trimethylbenzoyldiphenylphosphine oxide).

The photoinitiators, which are used in amounts of from 0.1 to 15, preferably from 1 to 10, % by weight, based on the polymerizable components and depending on the intended use, can be employed as an individual substance or, owing to frequent advantageous synergistic effects, also in combination with one another.

EXAMPLES

Example 1

700 g of a polyetheracrylate (Laromer® LR 8748) were heated to 70° C., and 42 g of methylethanolamine were added. After a reaction time of 4 hours at 70° C., 105.5 g of an isocyanurate based on hexamethylene diisocyanate and 0.17 g of dibutyltin dilaurate were added. The reaction was allowed to continue for a further 5 hours at 80° C.

Iodine color number (ICN): 2 (according to DIN 6162) Viscosity: 3.5 Pa·s (determined using a plate-and-cone viscometer)

Examples 2 to 6

0.16 g of dibutyltin dilaurate was added to 800 g of a hydroxylamino-modified polyetheracrylate and isocyanate, according to Table 1, and the mixture was heated to 80° C. The reaction was continued for 5 hours at this temperature, after which the product was filtered.

TABLE 1

| Isocyanate | | | Product |
|---|---|---|---|
| Type | Amount | ICN | Viscosity (Pa.s) |
| IPDI [1] | 55.5 | 3 | 10.7 |
| IPDI | 27.8 | 2 | 2.4 |
| TDI [2] | 42.0 | 1 | 9.4 |
| TDI | 21.0 | 1 | 2.3 |
| Isocyanurate [3] | 47.2 | 1 | 7.0 |

[1] isophorone diisocyanate
[2] toluylene diisocyanate
[3] isocyanurate of hexamethylene diisocyanate

Examples 7 to 12

0.16 g of dibutyltin dilaurate was added to 750 g of an amino-modified (not an OH-amine) polyetheracrylate (Laromer® LR 8889) and isocyanate, according to Table 1, and the mixture was heated to 80° C. The reaction was continued for 5 hours at this temperature, after which the product was filtered.

TABLE 2

| Isocyanate | | | Product |
|---|---|---|---|
| Type | Amount (g) | ICN | Viscosity (Pa.s) |
| IPDI [1] | 55.5 | 10 | 0.41 |
| IPDI | 27.8 | 5 | 0.22 |
| TDI [2] | 42.0 | 3 | 0.47 |
| TDI | 21.0 | 2 | 0.22 |

TABLE 2-continued

| Isocyanate | | | Product |
|---|---|---|---|
| Type | Amount (g) | ICN | Viscosity (Pa.s) |
| Isocyanurate [3] | 94.3 | 4 | 1.11 |
| Isocyanurate | 47.2 | 3 | 0.34 |

[1] isophorone diisocyanate
[2] toluylene diisocyanate
[3] isocyanurate of hexamethylene diisocyanate

We claim:

1. A urethane(meth)acrylate obtained by
   a) reacting polyether(meth)acrylates, polyester(meth)acrylates or epoxy(meth)acrylates with primary or secondary amino compounds which have at least one hydroxyl group, so that from 0.5 to 60 mol % of the (meth)acrylate groups are present in the form of Michael adducts with the amino compounds, and
   b) subsequently reacting the product contained in a) with isocyanate compounds having an average functionality of at least 2 in an amount such that there are from 0.7 to 1.3 OH groups per NCO group, at least one of the hydroxyl groups reacted with said isocyanate compound being a hydroxyl group of the amine used to form the Michael adduct.

2. A urethane(meth)acrylate as claimed in claim 1, wherein the polyether(meth)acrylates, polyester(meth)acrylates or epoxy(meth)acrylates have from 1 to 5 (meth)acrylate groups in the molecule.

3. A urethane(meth)acrylate as claimed in claim 1, wherein from 0.5 to 30 mol % of the (meth)acrylate groups have been converted into the Michael adduct by adding amino compounds having from 2 to 6 amine hydrogen atoms (N—H) and a hydroxyl group.

4. A urethane(meth)acrylate as claimed in claim 1, wherein the isocyanates have from 2 to 5 isocyanate groups in the molecule.

5. A process for the preparation of a urethane(meth)acrylate as claimed in claim 1, wherein polyether(meth)acrylates, polyester(meth)acrylates or epoxy(meth)acrylates, which have at least one free hydroxyl group and in which from 0.5 to 30 mol % of the (methacrylate groups are present in the form of a Michael adduct with primary or secondary amines, are reacted with isocyanates.

6. A process as claimed in claim 5, wherein the isocyanates are used in amounts such that there are roughly equimolar amounts of isocyanate groups, based on the hydroxyl groups.

7. A radiation-curable material, containing a urethane (meth)-acrylate as claimed in claim 1.

8. A cured coating comprising a radiation-curable material as claimed in claim 9.

9. A urethane(meth)acrylate as claimed in claim 1, wherein said polyether(meth)acrylates, polyester(meth)acrylates or epoxy(meth)acrylates have at least one free hydroxyl group before being reacted to form Michael adducts with said primary or secondary amino compounds having at least one hydroxyl group.

10. A urethane(meth)acrylate as claimed in claim 1, wherein all of the hydroxyl groups reacted with said isocyanate compound are hydroxyl groups of the amine used to form the Michael adduct.

* * * * *